July 15, 1941.     G. T. BALFE     2,249,547
WINDSHIELD
Filed Sept. 23, 1939
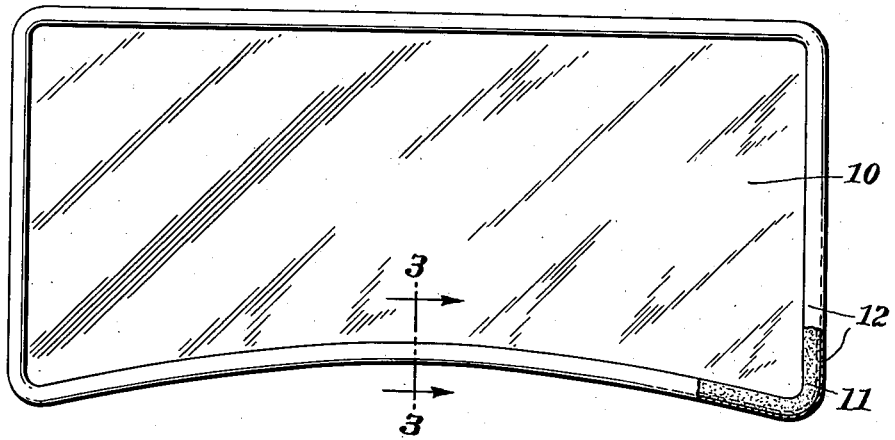
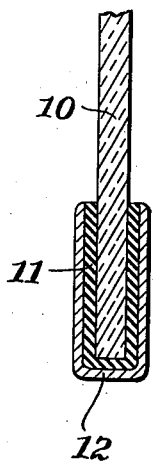
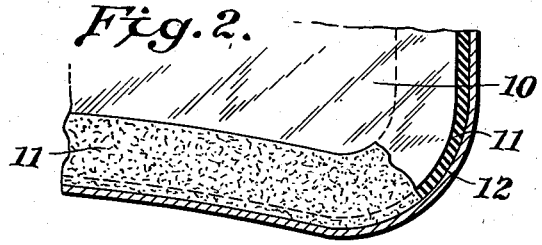
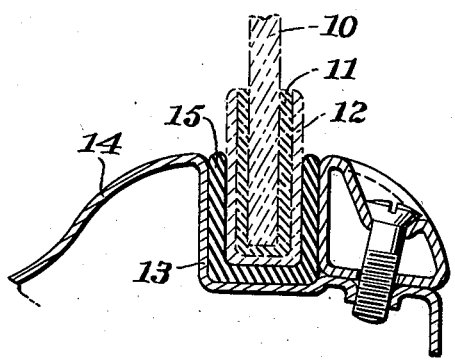
Inventor:
George T. Balfe,
By Cushman Darby & Cushman
Attorneys.

UNITED STATES PATENT OFFICE 2,249,547

WINDSHIELD

George T. Balfe, Detroit, Mich., assignor to Detroit Gasket & Mfg. Company, Detroit, Mich., a corporation of Michigan Application September 23, 1939, Serial No. 296,297

5 Claims. (Cl. 296—84)

This invention relates to window mountings in general and is particularly useful in connection with windshields of automobiles and aeroplanes.

The object of the invention is to provide a window mounting which is permanently leakproof. In the case of automobiles and aeroplanes where both vibration and weathering are encountered, a reliable seal against the entrance of dust and water is necessary.

The usual windshield combination includes a frame, a glass, and a sealing means interposed between the glass and frame. The present invention provides an improved leakproof sealing strip and moreover extends the life of the construction very considerably since it is self-sealing and compensates for inequalities in fit between the glass and frame as well as conditions created by temperature variations and vibration.

Fully vulcanized rubber stripping, because of its high elasticity, presents a disadvantage in being difficult to apply satisfactorily to the glass and the channel, especially at the corners where it wrinkles on the glass or tends to pull away from the channel wall, thereby detracting from the close fit which is necessary to prevent leakage between the glass and the channel. The elasticity of the fully cured product, as will be appreciated, makes it extremely hard to obtain a permanent hugging of the glass and channel by the strip and afford a suitable seal at these points. Fully vulcanized rubber stripping is entirely devoid of tackiness, and, therefore, the use of cements is absolutely necessary to bond the material to the glass and frame. These cements are expensive and also difficult to apply, especially in the corners where the quite elastic stripping must be tightly held in place until the cement has dried. Also in practice, a windshield is subjected to continuous vibration, and it frequently occurs that the cement bond becomes broken. In view of the high elasticity of the strip and the fact that the cement is fully dried, leakage and rattling will occur at these points, and also the strip will tend to pull away from the glass or channel.

In contrast with an unvulcanized, i. e., uncured, rubber strip which on stretching remains permanently elongated, the channel strip of the present invention is possessed of elasticity, so that although it is stretchable, it has a definite return, characteristic of vulcanized rubber, due to the fact that the rubber is partially vulcanized. Furthermore, the partially vulcanized strip of the present invention has sufficient strength to allow it to be stretched without tearing.

The sealing strip of the present invention possesses the advantageous characteristics of permanent plasticity, flexibility, compressibility, and resilience. The strip, moreover, has a permanent tacky surface which is adherent to metal and glass. The composition includes rubber and a resilient filler, e. g., comminuted cork, the latter affording a highly satisfactory compressible factor and supplying body to the product. The vulcanizing of the composition is carried out to the extent of imparting to the material the required strength, i. e., resistance against tear when stretched or deformed, combined with flexibility, plasticity, and resilience but not to the point where the surface tackiness of the material is impaired. In fact, the proportions of rubber to cork and the extent to which vulcanization is allowed to proceed are critical. That is, control of these two factors is necessary to secure the above properties and produce a sealing strip which is self-sealing and does not tear, disintegrate, or loosen up when subjected to weathering and vibration.

By permanent plasticity I mean that as distinguished from true resiliency, the material can be compressed and deformed without disrupting and upon removal of the forces exhibits a slow return. This property of permanent plasticity and accompanying compressibility and rebound renders the combination in effect self-sealing and free of rattling. By flexibility I mean that the material can be positioned in a window channel or about a glass so as to be intimate sealing contact throughout the periphery of the channel and glass. Notwithstanding that the configuration of the periphery of the glass and the channel is characterized by sharp outlines, such as angles and curves, the plasticity cooperates with the flexibility to permit a workman to apply the stripping in a manner to assure a close contact or hugging of the sealing strip with the window and channel. By resiliency I mean the material can be stretched and has compression and rebound, but as distinguished from elastic fully vulcanized rubber products, it does not have such a sharp and quick return. The plasticity and flexibility characteristics cooperate with the resiliency so that the strip may be deformed and compressed to maintain at all times and under all circumstances a close sealing fit. At the same time, the resiliency, i. e., the return force of the compressed material, is insufficient to interfere with continuous and complete adherence of the material throughout the periphery of the glass and channel, and the close contact or hugging is obtained without placing the material under any substantial elastic tension. That is, while the sealing material has compressibility and rebound, there is no tendency of the sealing strip to draw away from the channel or so tightly grip the glass as to ultimately lose its life and elastic characteristics and produce cracking or objectionable looseness.

As stated, a strip of the improved sealing material can be disposed about the window glass entirely in adherent contact with the periphery thereof without being under an undue elastic tension. Similarly, the strip may be disposed in the channel of the frame in complete adherent contact with the base and wall or walls of the channel without being under any substantial elastic strain. This is important, first, because it assures there will be no openings or gaps between the glass and the strip, or the frame and the strip, which would impair the leakproofness. Second, since the strip is not under a substantial elastic strain, it exhibits no tendency to break the adherent union with the glass and frame or to draw away from the channel and lose its elasticity and life whether it is positioned in the channel or about the windshield glass. This maintenance of the elastic life of the product eliminates wrinkling, cracking, and disintegration as would take place with materials which must be applied under a constantly high stretching force, i. e., when the elastic limit of the material is constantly greatly exceeded. Moreover, the provision of a material having permanent plasticity, adherence, flexibility, and a critical measure of resilience or stretch allows for compensation due to movement of the mounting under temperature variations as well as vibration. The problems incident to expansion and contraction of the glass and frame, accompanied by vibration in an aeroplane or automobile, are successfully overcome by reason of the easy deformability of the sealing material and its slow return and by the adherence of the strip to the glass and frame. The various factors above related have not heretofore been combined in a sealing strip for a window mounting, and their presence in my improved construction affords a reliable construction in which the strip permanently adheres to the glass and frame throughout its area of contact therewith.

From an appreciation of the characteristics of the stripping material of this invention, it will be understood that a workman may readily apply the same in close contact with the periphery of the glass or window channel, i. e., in metal sealing relation, and without the necessity for expensive cements or tedious and unreliable methods. That is, the adherence and the plastic, flexible, and somewhat resilient nature of the strip enables an operator to readily place the strip in position with assurance that the desired sealing effect will be permanently obtained without reliance upon a high elasticity factor or doubtful cements. This is an important achievement since, as explained above, one of the difficulties with the present available stripping materials is their high elasticity coupled with lack of plasticity and adherence whence the workman cannot with ease place the material in sealing contact with the surface to be sealed.

The composition of the present invention, in addition to rubber, a resilient filler, such as comminuted cork, and a vulcanizing agent, preferably includes other ingredients, such as means for giving the product a smooth finish, pigments, zinc oxide, and accelerators. A suitable composition produced in accordance with the present invention includes ingredients in substantially the following proportion:

| | |
|---|---|
| Brown crepe rubber | 23 lb. |
| Reclaim rubber | 125 lb. |
| Paraffin | 5 lb. |
| Cork dust | 95 lb. |
| Zenite | 8 lb., 9 oz. |
| Diphenyl guanidine | 2 lb., 4 oz. |
| Thionex | 4 oz. |
| Carbon black | 5 lb. |
| Sulphur | 3 lb. |
| Zinc oxide | 5 lb. |

In the above composition, the rubber which predominates by weight also acts as a binder for the cork filler; the paraffin is used to give a smooth finish; the carbon black is used to impart uniform color; the zinc oxide is used to activate acceleration; the sulphur is the vulcanizing agent; Zenite, diphenyl guanidine, and thionex are examples of suitable accelerators which may be employed, and, of course, it would be possible to use only a single accelerator if desired.

With reference to the proportions of rubber and cork, these are critical to obtain a product having the aforesaid properties. The variation which may be permitted should be such as to assure that a product having the desired permanent plasticity, flexibility, compressibility and rebound, and surface adherence or tackiness is obtained when the composition is subjected to partial vulcanization as will be later described.

Other fillers may be substituted for the cork dust, such as wood flour, cotton flock, or the like, but cork dust is preferred.

Likewise the vulcanizing agent may consist of a sulphur yielding material as carbon disulphide or a thiuram disulphide.

By the use of reclaim rubber, the cost of the composition is materially reduced, and it is found that very satisfactory results can be obtained when the amount of reclaim rubber is materially greater than that of the brown crepe rubber.

The essential ingredients of the composition are the rubber and compressible filler material and the vulcanizing agent. Various of the other ingredients may be omitted if desired, but their use is preferred.

The above ingredients are mixed in a Banbury mixer and slabbed off on a mill for storing or ageing. Preferably, the stock is warmed up on the mill and calendered to gauge. The strip material is then rolled up in 200 yard liners, for instance, of cheese cloth, and placed in a gas heated oven and cured 20 hours at 175° F. The important and critical considerations are the proportion of ingredients and the extent of vulcanization whereby a stripping material having surface tackiness and the various characteristic properties heretofore above recited is preduced.

Preferably, the temperature to which the material is subjected is not below 170° F. and does not exceed 180° F., and the period of heat treatment should not greatly exceed 20 hours with about the proportions of accelerators and vulcanizing agent to the total rubber employed as given in the above example. It will be appreciated that the extent of vulcanization may be controlled by the amount of vulcanizing and accelerators as well as by the temperature and time of the heat treatment. All of this control, however, is exerted to the end that a material having permanent plasticity, flexibility, resilience, and surface adherence is produced and which has the required strength to form a satisfactory self-sealing window stripping.

For purposes of illustration I have shown several types of window mountings, and referring to the drawing:

Figure 1 is a view in elevation, partly broken away, of one form wherein the stripping material is adhered about the periphery of the glass and to the wall of a window channel;

Figure 2 is an enlarged detail view of the construction shown in Figure 1;

Figure 3 is a sectional view on the line 3—3 of Figure 1, and

Figure 4 is a sectional view in which a window frame having a channel is provided with a liner of the stripping material and in which is disposed a glass having a liner of the stripping material overlaid with a channel or beading of metal.

In the drawing, the numeral 10 indicates a windshield glass positioned in a metal frame or channel 12, the frame and glass having disposed about the peripheries thereof a strip 11 of the sealing material of this invention. It is to be noted that the strip material hugs the glass and metal in a manner to produce a completely dustproof and waterproof seal devoid of gaps, wrinkles, or openings. The strip material may be positioned about the glass and then disposed in the channel, or it may be disposed in the channel 12 as a liner, and then the glass positioned in the channel which has been so lined.

The modification shown in Figure 4 includes a window channel 13 formed in a frame 14 lined with the strip material of this invention as shown at 15 and in which is disposed the glass 10 having about its periphery a strip of the improved composition 11 encased in a metal bead or channel 12.

Other window mounting constructions and combinations may be similarly improved and rendered leakproof and rattleproof by reason of the strip material of this invention, and as stated above, the drawing is simply representative of two instances of the use of the material.

I claim:

1. In a glass mounting, a glass, a frame for supporting the glass, and a sealing means between the glass and frame in the form of an elastic, stretchable strip of partially vulcanized rubber and a filler, said strip having the property of return when stretched, flexibility, compression and rebound, and a tacky surface.

2. An elastic, stretchable sealing strip for sealing a glass edge, comprising partially vulcanized rubber and a filler, said strip having the property of return when stretched, flexibility, compression and rebound, and a tacky surface.

3. A sealing strip in accordance with claim 2 in which the filler is a compressible material.

4. A sealing strip in accordance with claim 2 in which the filler is finely divided cork.

5. A sealing strip in accordance with claim 2 in which the rubber preponderates by weight.

GEORGE T. BALFE.